United States Patent
Timm

[19]

[11] Patent Number: 6,069,996
[45] Date of Patent: *May 30, 2000

[54] DEVICE FOR HEATING A DRINKABLE LIQUID

[76] Inventor: Eberhard Timm, Rahheideweg 15, 21279 Appel, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/860,398
[22] PCT Filed: Dec. 29, 1995
[86] PCT No.: PCT/EP95/05171
  § 371 Date: Jun. 19, 1997
  § 102(e) Date: Jun. 19, 1997
[87] PCT Pub. No.: WO96/22719
  PCT Pub. Date: Aug. 1, 1996

[30] Foreign Application Priority Data

Jan. 26, 1995 [DE] Germany .................. 295 01 228 U

[51] Int. Cl.⁷ ..................................................... F24H 1/18
[52] U.S. Cl. .................. 392/444; 392/442; 392/447; 99/282; 99/283; 99/296
[58] Field of Search ................................. 392/444, 445, 392/447, 442; 219/429, 433; 99/283, 296, 282

[56] References Cited

U.S. PATENT DOCUMENTS 2,856,843 10/1958 Miklas ......................................... 99/282
5,098,062 3/1992 Lungu ........................................ 251/65
5,259,295 11/1993 Timm ........................................ 99/282
5,287,796 2/1994 Timm ........................................ 99/282

FOREIGN PATENT DOCUMENTS

A-47911 of 1992 European Pat. Off. .
A-2121322 of 1972 Germany .
A-2643557 of 1978 Germany .
U-8900220 of 1989 Germany .
WO 89/10511 of 1989 WIPO .

Primary Examiner—Teresa Walberg
Assistant Examiner—Jiping Lu
Attorney, Agent, or Firm—Medlin & Carroll, LLP

[57] ABSTRACT

The device for heating a drinkable liquid, having a liquid-storage container (9) and an electric heating element (11) arranged therein, the liquid-storage container (9) having a valve which is arranged at the bottom in the base (12) of the liquid-storage container (9) and of which one sealing surface is the border of an opening (14) in the base (12) and which opens, in a manner which cannot automatically be reversed, on account of the base curving outwards at a predetermined internal pressure in the container, and the power supply to the heating element (11) being designed such that it is interrupted when the pressure in the liquid-storage container (9) is essentially equal to the atmospheric pressure, which device can be positioned on a collecting container for the liquid, is distinguished in that the other sealing surface of the valve is a plate-like element (15) which consists of elastic material and, in its non-loaded state, is shaped essentially conically, with the cone tip directed towards the interior of the liquid-storage container (9), and is retained at this tip.

6 Claims, 6 Drawing Sheets

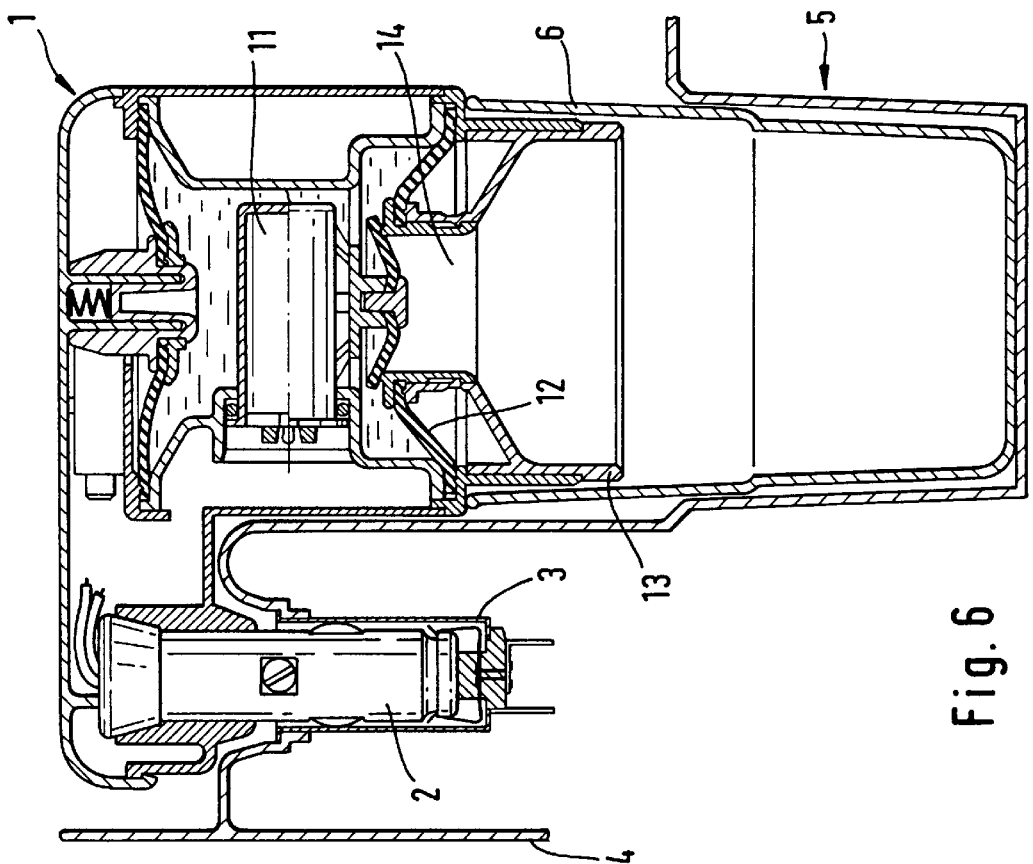
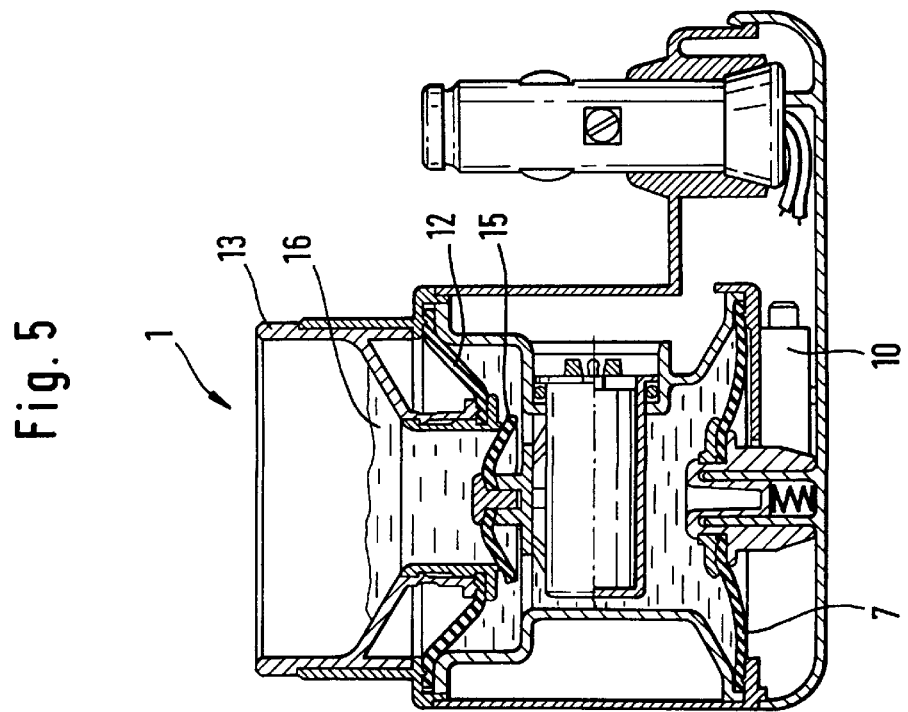

DEVICE FOR HEATING A DRINKABLE LIQUID

The invention relates to a device for heating a drinkable liquid, having a liquid-storage container and an electric heating element arranged therein, the liquid-storage container having a valve which is arranged at the bottom in the base of the liquid-storage container and of which one sealing surface is the border of an opening in the base and which opens, in a manner which cannot automatically be reversed, on account of the base curving outwards at a predetermined internal pressure in the container, and the power supply to the heating element being designed such that it is interrupted when the pressure in the liquid-storage container is essentially equal to the atmospheric pressure, which device can be positioned on a collecting container for the liquid.

A known device of this type (EP-A-0479111) is predominantly used in vehicles, in motion, for making hot drinks or, for example, also soup. The device filled with a drinkable liquid, in particular water, and a collecting container are carried for this purpose. If one wishes to have a hot drink or soup, then the device is positioned on the collecting container and connected to an electric power source. The liquid is then heated and expands, the internal pressure being increased further by the expansion of the liquid, by gases which may be located in the storage container or by gases contained in the liquid. When a certain overpressure is reached, then the valve opens irreversibly, and the hot liquid flows into the collecting container. A drink or soup which has been introduced beforehand into the collecting container in the form of a dry substance or has been provided at the bottom of the liquid container, for example in a suitable liquid permeable receptacle, is made in the process. The device is then removed, and the liquid can be drunk from the collecting container or else, in the case of soup, spooned therefrom. It is also known that the device can be reused and refilled with liquid by the user and made ready for use.

The device is straightforward, expedient as well as safe. This is because, at the moment when the liquid has emptied into the collecting container and overpressure can no longer prevail in the liquid-storage container, the power supply is interrupted, with the result that the heating element cannot be heated any further.

The previously known device has the disadvantage, on the one hand, that the throughflow area of the valve is comparatively small. Moreover, when the valve opens, there is friction between the lip seal and the annular border of the base opening, which, in some circumstances, prevents reliable opening of the valve.

The object of the invention is to provide a device of the type mentioned in the introduction having a valve which operates safely and reliably and has a large throughflow cross section. In many cases, the advantage of the large throughflow cross section is that the drinks are made more uniformly.

The solution according to the invention consists in that the other sealing surface of the valve is a plate-like element which consists of an elastic material and, in its non-loaded state, is shaped essentially conically, with the cone tip directed towards the interior of the liquid-storage container, and is retained at this tip.

As with the previously known valve, one sealing surface of the valve is thus the border of the base opening. The other sealing surface, however, is a platelike element which consists of elastic material and, in its non-loaded state, is shaped such that it essentially assumes the shape of the surface of a cone. When the base is pressed inwards, then the border of the base opening comes to rest against this cone and presses the border of the plate-like element inwards, with the result that it rests in a prestressed sealing manner here, against the border of the opening. If the internal pressure increases and the base is pressed outwards, then first of all the plate-like element follows until the base springs outwards, in which case the connection between plate-like element and border of the base opening is released and the liquid can flow out through the large flow cross section.

If the device is provided at the base with a funnel which widens outwards, then the liquid can be introduced with the aid of this funnel. If one then presses on the funnel, then the base is pressed inwards, as a result of which the valve assumes its closed position.

If the device has a plug which is intended for the supply of electric current and contains one or more pins which is or are parallel to the, when in use, vertical axis of the device, then the plug can be plugged into a corresponding socket with likewise vertical bores, with the result that the device is retained in the correct alignment for heating the liquid. When the plug is plugged into the socket, the device is moved vertically downwards and, at the same time, can be inserted into a collecting container, which is likewise set up vertically.

The collecting container may have a screen filter with a central opening. The liquid can pass without obstruction into the collecting container through the central opening when the drink is being made. When the liquid is drunk, solid residues such as tea leaves or coffee grounds are then caught by the screen, which is arranged in the border region. Moreover, this screen filter prevents the liquid from slopping over in moving vehicles.

The invention advantageously provides a receptacle for receiving a device and a collecting container of the abovementioned type, which receptacle has a socket for the introduction of the plug and a recess for the insertion of the collecting container. This receptacle, which may designed, in particular, in the manner of a case, can be easily taken along on journeys. It is then always possible to make hot drinks with the aid of the device. All that is necessary is a power source, for which purpose, in motor vehicles, use can be made of the 12-volt power supply or 24-volt power supply via the cigarette-lighter connection.

The invention is described hereinbelow with reference to an advantageous embodiment and in conjunction with the associated drawings, in which:

FIGS. 3 to 8 show different steps during the usage of the device of the invention;

Figure 1:
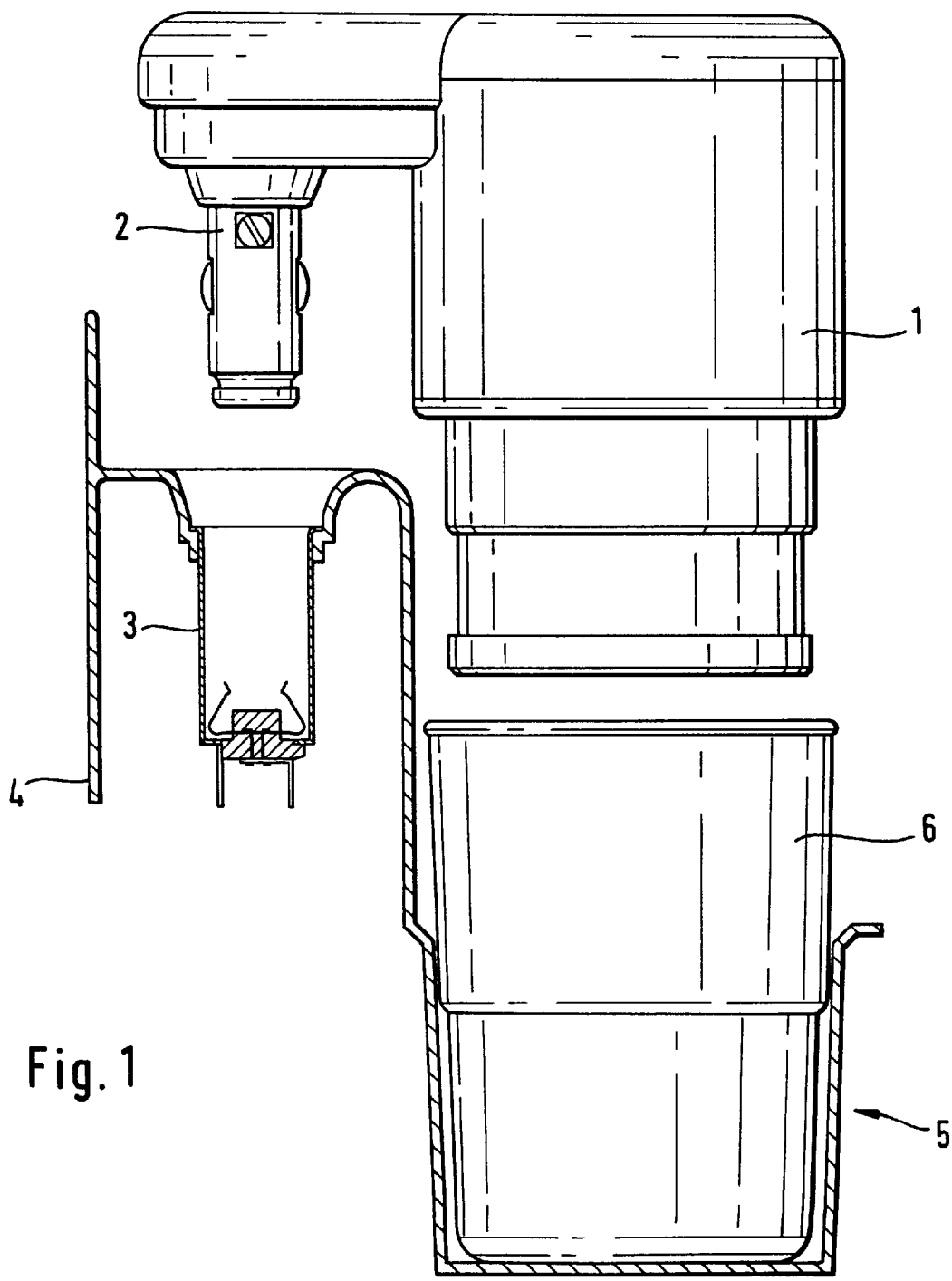
FIG. 1 shows an overall view of the principle of the device, of the collecting container and of a mount, partially in section.

As is shown in FIG. 1, the device 1 according to the invention has a plug 2 by means of which it can be inserted into a socket 3 of a portable receptacle 4. The portable receptacle 4 is provided with a hollow 5 for receiving a collecting container 6 into which the device according to the invention can be inserted if it is moved downwards, in which case the plug 2 is also inserted into the socket 3.

The device 1 according to the invention has a top diaphragm 7 to which inwardly directed pressure is applied by a spring 8. If the diaphragm 7, with the operating cone fastened thereon, is pressed outwards (upwards in FIG. 2) by overpressure in the liquid-storage container 9, then a microswitch 10 is switched by the slope of the operating cone during displacement, with the result that a heating cartridge 11 in the liquid-storage container 9 can be supplied with power. The base 12 of the liquid-storage container 9 is likewise designed in the manner of a diaphragm, the latter having two stable positions, that is to say the outwardly directed position shown in FIG. 2 and the inwardly directed position shown, for example, in FIG. 5. A funnel 13 is fastened on the diaphragm 12. The diaphragm-like base 12 has a central opening 14. Opposite this opening 14 is an elastic plate-like element 15 which, in the non-deformed state, is shaped like the lateral surface of a cone.

The device works as follows.

Figure 2:
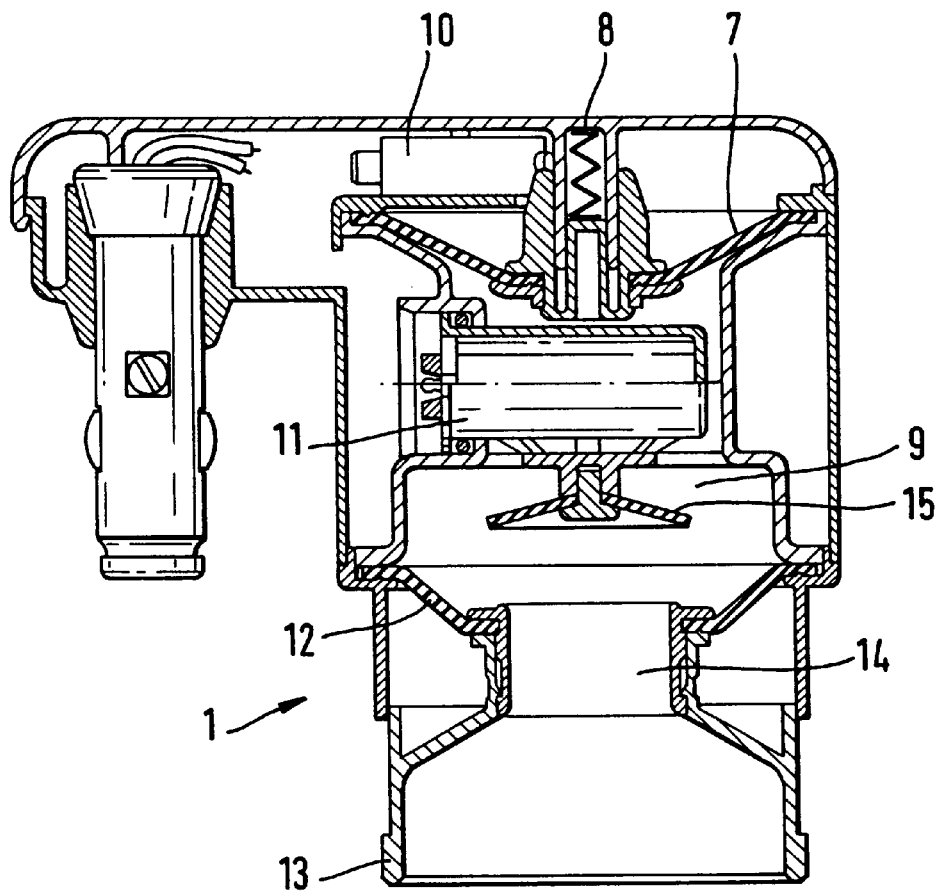
FIG. 2 shows the device of the invention in section.
Figure 4:
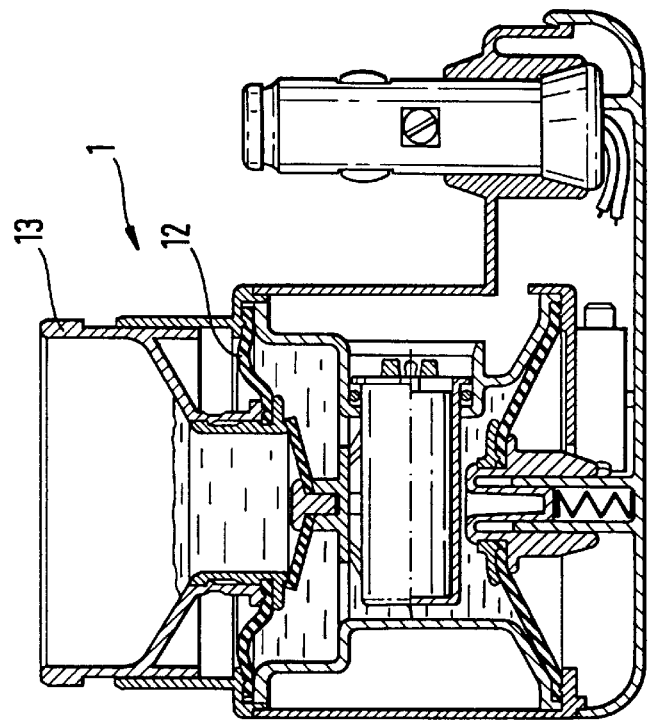
Figure 3:
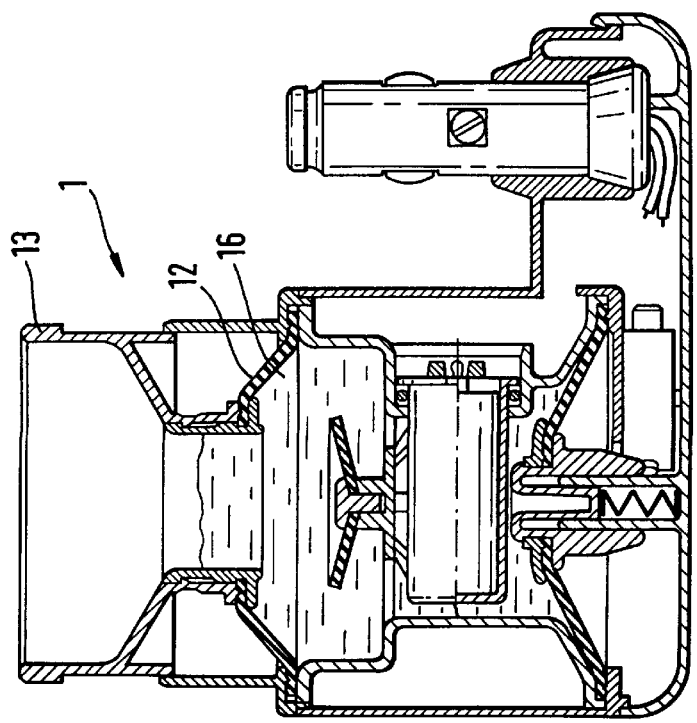

First of all, the device 1 illustrated in FIG. 2 is turned over to stand on its head. In this position, shown in FIG. 3, it is filled with liquid 16 with the aid of the funnel 13. The funnel 13 is then pressed down, as a result of which the base diaphragm 12, as is shown in FIG. 4, moves from the outwardly curved position into the inwardly curved position shown in FIG. 5. The plate-like element 15 is then deformed inwards and thus seals the base. The overpressure produced also presses the diaphragm outwards and thus closes the microswitch 10. The device 1 is then turned over, any excess liquid 16 which is still present in the funnel 13 being poured away in the process. If this liquid is not water, but milk for example, then, of course, it is possible to introduce less liquid during filling so that there is no need to pour away any liquid.

The device 1 is then inserted into the collecting container 6, as illustrated in FIG. 6, the plug 2 being inserted into the socket 3 of a receptacle 4 which has a hollow 5 for receiving the collecting container 6. In this case, part of the funnel 13 is inserted into the collecting container 6.

Figure 7:
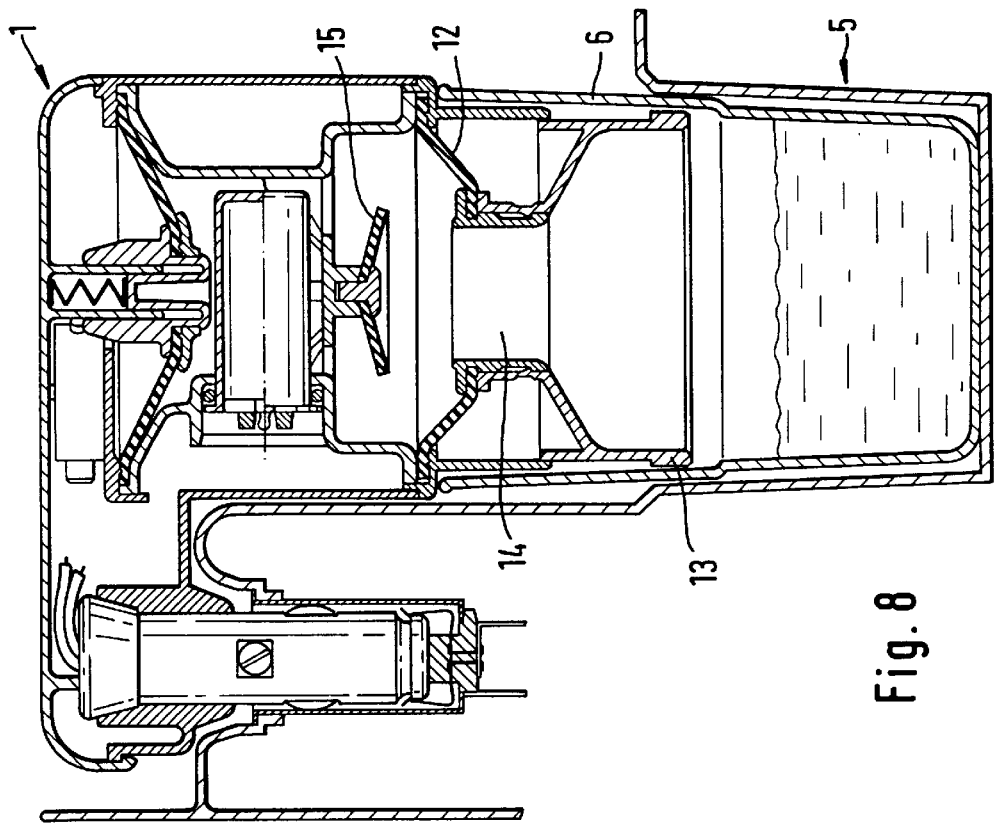
Figure 8:
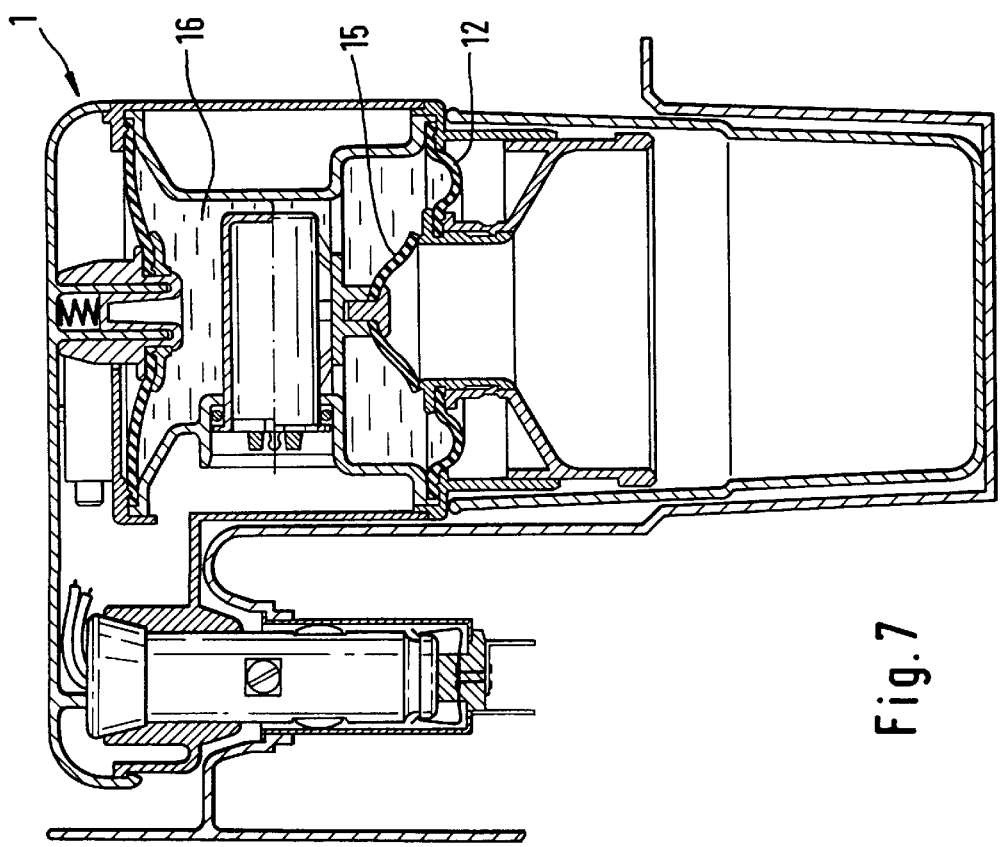
Figure 10:
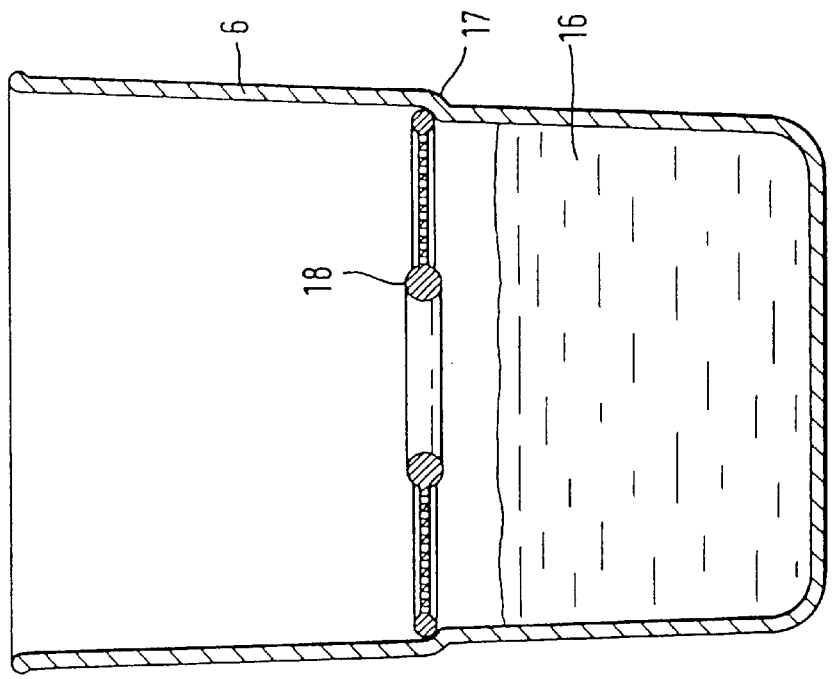
FIG. 10 shows, in section, the collecting container with the screen filter of FIG. 9.

If electrical power is then supplied, the heating element 11 is heated, as a result of which the liquid 16 is heated. The base diaphragm 12 is pressed downwards gradually, the plate-like elastic element 15 initially following this and still keeping the liquid-storage container 9 closed. In the position shown in FIG. 7, the base diaphragm 12 is in a state which it assumes shortly before it moves downwards, as is shown in FIG. 8. In this position, the base diaphragm 12 and the annular opening 14 have been released from the plate-like elastic element 15, which returns into its original position. The liquid can then flow out downwards into the collecting container 6, through the large opening cross section, very quickly and suddenly. The drink is then made with the substance which has been provided beforehand in the collecting container 6 or in the funnel 13. After the device 1 has been drawn off upwards, it is also possible for the collecting containers 6 to be removed from the hollow 5, and the drink or soup can be consumed.

The plate-like elastic element also acts as part of a safety valve. In the case of a defect of the funnel guidance or improper handling by the user, the elastic plate-like element 15 cannot carry out the displacement necessary for opening the valve. In this case, the internal pressure in the water container will rise and, before the container is damaged, the elastic plate-like element 15 of the valve slips away from the seat, as a result of deformation, and is pressed into the sleeve 14. The resulting leakage and the reduction in pressure switch the appliance off.

Figures 9A, 9B, 9C:
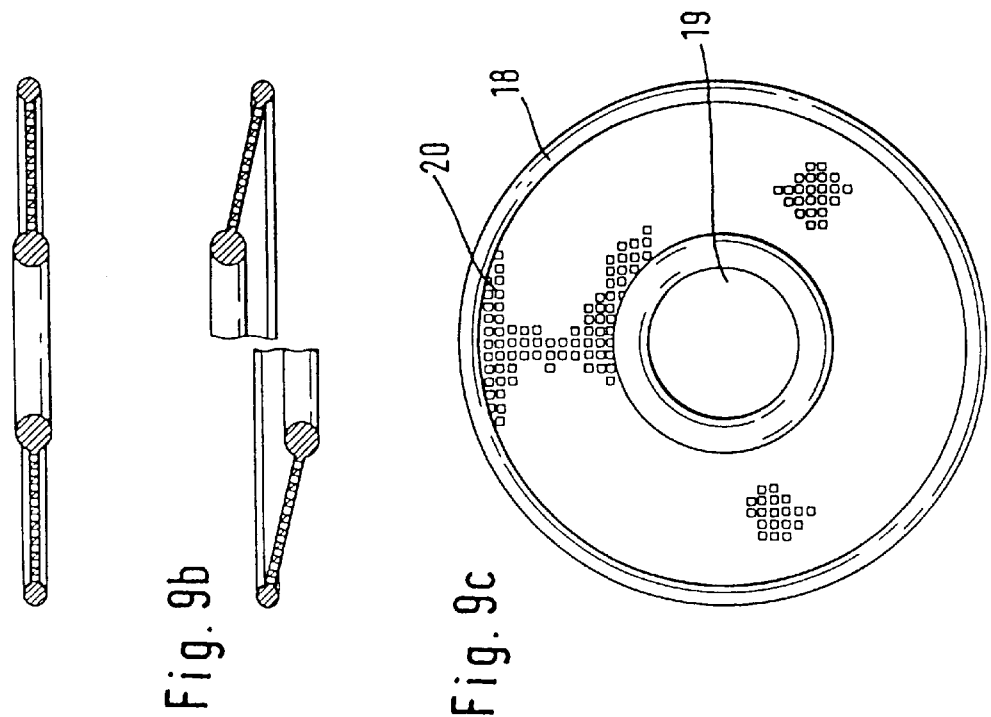
FIG. 9 shows various illustrations of a screen filter which can be inserted into the collecting container.

As can be seen from the figures, the collecting container 6 has a step 17 on which a screen filter 18 can be positioned, as is shown in FIG. 9. This screen filter 18 has a central opening 19 through which the liquid can easily pass when the drink is being made. On the one hand, when the drink is being drunk, solid constituents can be caught by the screen 20 provided in the border region. On the other hand, this screen can prevent the drink from slopping over in a moving vehicle.

What is claimed is:

1. A device, comprising:
   i) an electric heating element connectable to a power supply, positioned so as to be capable of heating a liquid-storage container, said liquid storage container comprising a base which is deformable from an outwardly directed position to an inwardly directed position, said base having a central opening, the border of which serves as a first sealing surface, and a second sealing surface comprising an elastic plate-like element having an essentially conical shape when said liquid-storage container is empty, wherein the tip of said essentially conical shape is directed towards the interior of said liquid-storage container, said plate-like element being deformable inwardly by pressure to seal said central opening of said base; and
   ii) a liquid-collecting container positioned under said liquid-storage container.

2. The device of claim 1, wherein said base further comprises a funnel which widens outwards.

3. The device of claim 1, wherein said liquid-collecting container comprises a screen filter with a central opening.

4. A device for heating a drinkable liquid, comprising a liquid-storage container and an electric heating element arranged therein, the liquid-storage container having a pressure-activated valve which is arranged at the bottom in the base of the liquid-storage container, said valve having first and second sealing surfaces, wherein said first sealing surface is the border of an opening in the base and which opens, in a manner which cannot automatically be reversed under internal pressure conditions where the base curves outwards at a predetermined internal pressure in the container, and said power supply to said heating element being designed such that it is interrupted when the pressure in the liquid-storage container is essentially equal to the atmospheric pressure, wherein said second sealing surface of said valve is a plate-like element comprising elastic material and, when not under the pressure of said drinkable liquid, is shaped essentially conically, with said cone tip attached towards the interior of the liquid-supply container; and further wherein said drinkable liquid is capable of passing through said opening when said second sealing surface does not form a seal with said opening.

5. The device of claim 4, wherein said base further comprises a funnel which widens outwards.

6. A method for heating a drinkable liquid, comprising:
   a. providing a device comprising:
      i) an electric heating element connectable to a power supply;
      ii) a liquid-storage container, said liquid storage container comprising a base which is deformable from an outwardly directed position to an inwardly directed position, said base having a central opening, the border of which serves as a first sealing surface; and a second sealing surface comprising an elastic plate-like element having an essentially conical shape when said liquid-storage container is empty, wherein the tip of said essentially conical shape is directed towards the interior of said liquid-storage container, said plate-like element being deformable inwardly to seal said central opening of said base; and
      iii) a liquid-collecting container positioned under said liquid storage container;
   b. filling said liquid-storage container by pouring a liquid through said central opening when said container is positioned upside-down to its liquid-dispensing orientation;
   c. pressing on said base such that said base moves from an outwardly curved position to an inwardly curved position and said plate-like element is deformed inwardly to seal said central opening in said base;
   d. turning said liquid storage container to its liquid-dispensing orientation; and e. heating said liquid by means of said electric heating element whereby internal pressure increases in said liquid-storage container and forces said base into its outwardly curved position thereby unsealing said central opening and releasing said liquid into said collecting container.

* * * * *